Sept. 16, 1924.  W. D. GILES  1,508,845
COUPLING FOR SUCKER RODS
Filed June 4, 1923  2 Sheets-Sheet 2
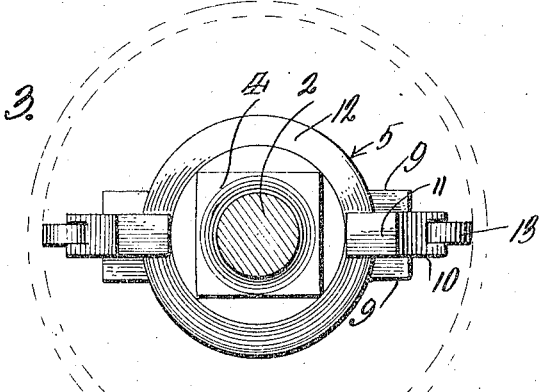
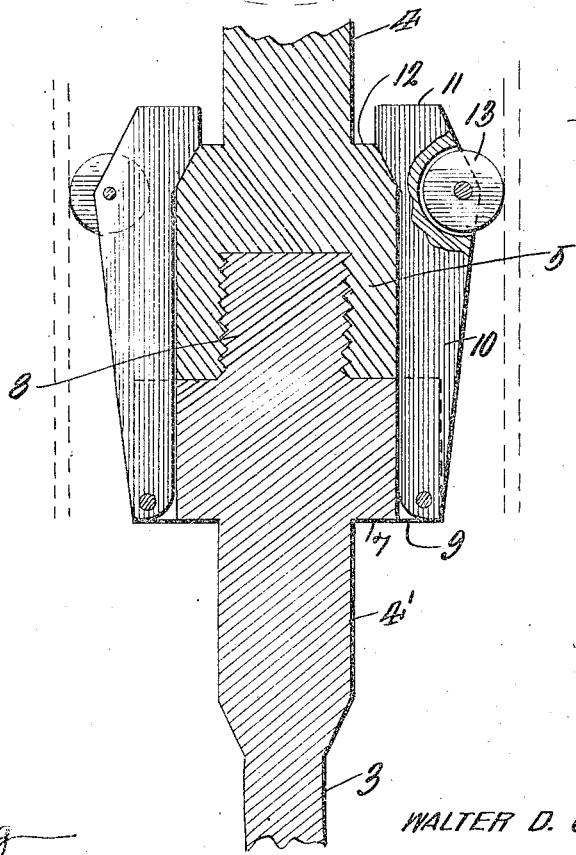
WITNESSES
INVENTOR
WALTER D. GILES
By Richard B. Owen
Attorney Patented Sept. 16, 1924.

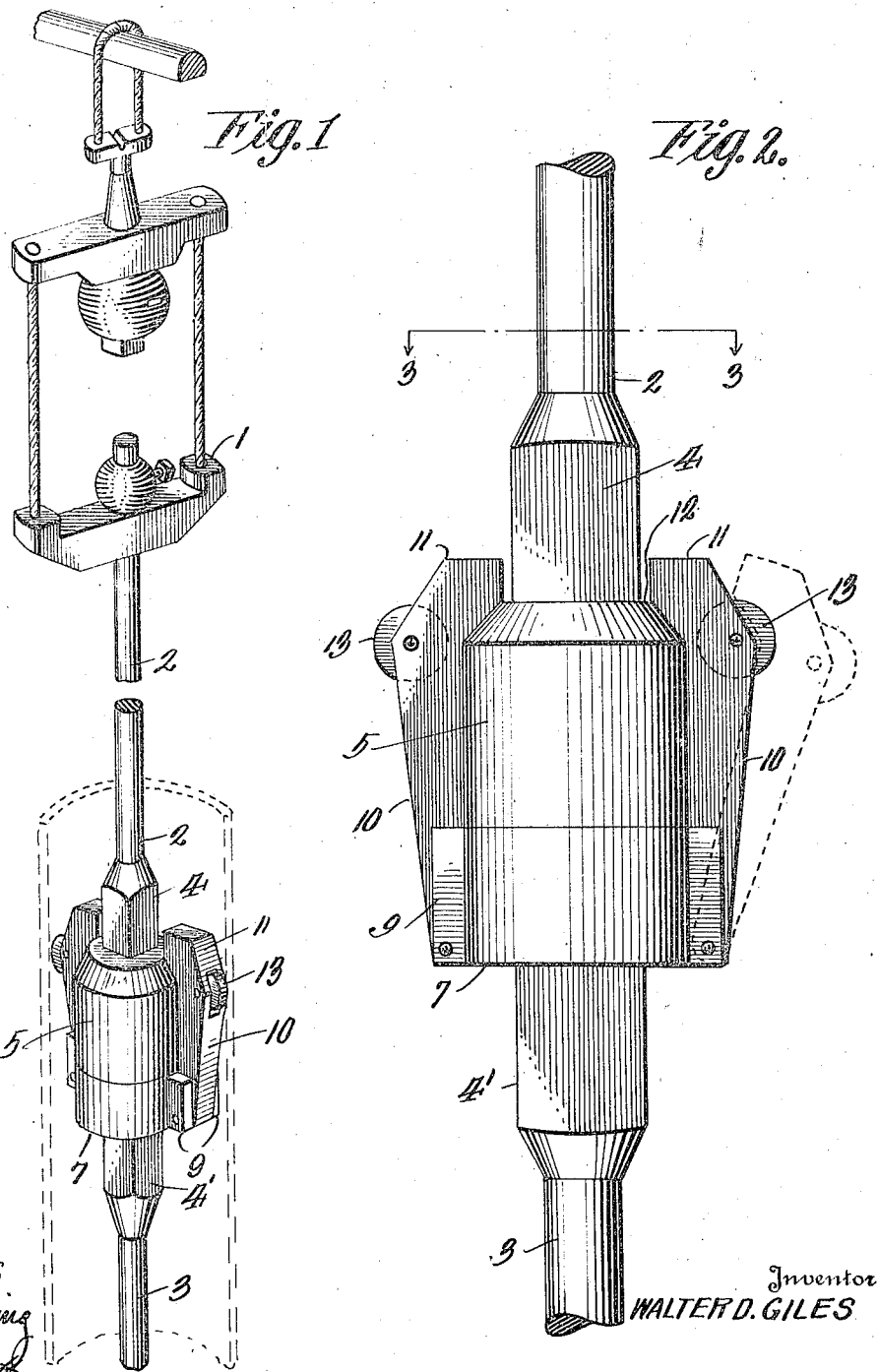

1,508,845

UNITED STATES PATENT OFFICE.

WALTER D. GILES, OF LEESVILLE, LOUISIANA.

COUPLING FOR SUCKER RODS.

Application filed June 4, 1923. Serial No. 643,474.

*To all whom it may concern:*

Be it known that I, WALTER D. GILES, a citizen of the United States, residing at Leesville, in the parish of Vernon and State of Louisiana, have invented certain new and useful Improvements in a Coupling for Sucker Rods, of which the following is a specification.

The present invention relates to a coupling for sucker rods and has for its principal object to provide a simple and efficient device of this nature which will be reliable and durable.

Another important object of the invention is to provide a coupling having means for preventing the same from becoming accidentally disengaged or unfastened and at the same time provided with antifriction means to engage the well casing.

Another object of the invention is to provide a coupling which is easily assembled and disassembled and which may be made at a comparatively low cost.

With the above and numerous other objects in view as will appear as the description progresses, the invention resides in certain novel features of construction, and in the combination and arrangement of parts as will be hereinafter more fully described and claimed.

In the drawing—

Figure 1 is a perspective view showing my coupling,

Figure 2 is a side elevation thereof,

Figure 3 is a section taken substantially on the line 3—3 of Figure 2 looking in the direction of the arrow, and Figure 4 is a vertical section through the coupling.

Referring to the drawing in detail it will be seen that 1 designates a saddle which I have shown and described in detail in my pending application bearing Serial Number 629,645, filed April 3, 1923. A polish rod 2 is supported by the saddle 1 and is connected to a sucker rod 3. My novel coupling is disposed between the rods 2 and 3 and a similar coupling is disposed between all of the sucker rods.

This coupling consists of a female member and a male member. The female member is attached to the bottom of the rods while the male member is attached to the top ends thereof. As the device is here illustrated the bottom end of rod 2 is provided with a square block portion 4 which may be engaged by a wrench for screwing the coupling together. At the bottom of this block 4 there is disposed an internally threaded socket 5. The rod 3 at its upper end is provided with the block 4' similar to block 4 previously described and a head 7 is mounted on the block and is provided with a reduced threaded stud 8 which is adapted to be screwed into the socket 5. Two pairs of spaced ears 9 are provided on the head 7 at diametrically opposed points so that arms 10 may be pivoted therein. These arms 10 have inward extensions or hooks 11 at their ends for engagement with the shoulder 12 formed by the upper end of the socket 5. These arms are disposed so that their hook extensions 11 engage the shoulders 12 and thus it is not possible to unscrew the socket from the stud. Antifriction devices in the form of rollers 13 are journaled on the outer edges of the arms 10 for engagement with the well casing as is indicated in Figures 1 and 4 by the dotted line structure. These rollers also prevent any wobbling tendency of the various sucker rods and tend to keep them in alignment with each other during their reciprocatory motion.

By the use of this coupling the life of the sucker rod is greatly lengthened and the operation thereof is much easier so that less power is necessary in their reciprocation.

The coupling which I have shown and described in detail relates to the preferred embodiment of the invention and it is to be understood that numerous changes may be made in the details of construction and in the combination and arrangement of parts without departing from the spirit of the invention as hereinafter claimed.

Having thus described my invention what I claim as new is:—

1. A coupling of the class described including a socket, a stud threaded in the socket, a head on the stud, arms pivoted to the head and provided with hook extensions for engaging the socket, and rollers mounted on the arms.

2. A coupling of the class described including two sections adapted to be threadedly engaged with each other, a pair of arms pivoted to one section and provided with hook extensions for engaging the other section thus preventing the sections from unthreading, and antifriction means on said arms.

3. A coupling of the class described including a socket, a stud threadedly associated with the socket, a pair of arms pivoted to the stud, said arms provided with hook extensions for engagement with the socket, and rollers provided on said arms.

In testimony whereof I affix my signature in presence of two witnesses.

WALTER D. GILES.

Witnesses:
B. O. VANBUREN,
ELECTO WADE.